United States Patent
Kumar (10) Patent No.: US 11,886,220 B2
(45) Date of Patent: Jan. 30, 2024

(54) DYNAMIC POWER-DOWN MANAGEMENT IN A COMPUTING DEVICE

(71) Applicant: QUALCOMM INCORPORATED, San Diego, CA (US)

(72) Inventor: Ajay Kumar, Bengaluru (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/737,997

(22) Filed: May 5, 2022

(65) Prior Publication Data

US 2023/0359265 A1    Nov. 9, 2023

(51) Int. Cl.
*G06F 1/3287* (2019.01)
*G06F 9/4401* (2018.01)

(52) U.S. Cl.
CPC ............ *G06F 1/3287* (2013.01); *G06F 9/442* (2013.01)

(58) Field of Classification Search
CPC ...................................... G06F 1/03; G06F 9/04
See application file for complete search history.

(56) References Cited

U.S. PATENT DOCUMENTS

| | | |
|---|---|---|
| 2011/0185208 A1 | 7/2011 | Iwamoto et al. |
| 2012/0146706 A1* | 6/2012 | Zheng ............... G06F 1/3228 327/365 |
| 2017/0024002 A1 | 1/2017 | Tzafrir et al. |
| 2017/0068308 A1 | 3/2017 | Park et al. |
| 2018/0032123 A1* | 2/2018 | Imade ............... G06F 1/329 |
| 2019/0050048 A1 | 2/2019 | Kang et al. |

OTHER PUBLICATIONS

Corresponding / related PCT App. Ser. No. PCT/US2023/017276, filed Apr. 3, 2023, entitled, "Dynamic Power-Down Management in a Computing Device," International Search Report & Written Opinion dated Jul. 14, 2023 by EPO acting as ISA, 11 pages.

* cited by examiner

*Primary Examiner* — Paul Yen
(74) *Attorney, Agent, or Firm* — Smith Tempel Blaha LLC/Qualcomm (57) ABSTRACT

In a computing device it may be determined whether to power down a subsystem based on how long the subsystem has been idle and based on one or more measurements of subsystem current consumption, subsystem bandwidth usage, and subsystem efficiency. An idle power-down count value may be determined based on the measurements, using predetermined relations among subsystem current consumption, subsystem bandwidth usage, and subsystem efficiency. The subsystem may be powered down based on a determination of whether the subsystem has been idle for an interval not less than the idle power-down count value.

30 Claims, 7 Drawing Sheets

DYNAMIC POWER-DOWN MANAGEMENT IN A COMPUTING DEVICE

DESCRIPTION OF THE RELATED ART

A computing device may include multiple subsystems, cores or other components. Such a computing device may be, for example, a portable computing device ("PCD"), such as a laptop or palmtop computer, a cellular telephone or smartphone, a personal digital assistant, a navigation device, a smartbook, portable game console, satellite telephone, etc.

The multiple subsystems, cores or other components of a computing device may be included within the same integrated circuit chip or in different chips. A "system-on-a-chip" or "SoC" is an example of one such chip that integrates numerous components to provide system-level functionality. For example, an SoC may include one or more types of processors, such as central processing units ("CPU"s), graphics processing units ("GPU"s), digital signal processors ("DSP"s), and neural processing units ("NPU"s). An SoC may include other processing subsystems, such as a transceiver or "modem" subsystem that provides wireless connectivity, a memory subsystem, etc.

As a PCD is powered by a battery, power management is an important consideration. "Power management" refers to techniques used to balance power consumption and performance in a PCD, as well as to manage the generation of thermal energy (i.e., heat). One power management technique involves selecting a power mode. For example, in a low-power mode one or more subsystems may be powered down. A memory subsystem is an example of a subsystem that may be powered down when it is determined that lower power consumption is of higher priority than higher performance, and powered up when it is determined that higher performance is of higher priority than lower power consumption. The determination of when to power down a memory subsystem may be based on a determination of how active (or conversely, how idle) the memory subsystem is.

A counter or timer may be used to determine how active the memory subsystem is. If a memory transaction has not been initiated within a predetermined number of clock cycles or "idle power-down count," then the memory subsystem may be powered down. A memory transaction occurring while the memory subsystem is powered down may trigger powering-up of the memory subsystem.

Powering down and powering up a memory subsystem incurs a certain amount of latency, potentially adversely impacting performance. A higher (more conservative) idle power-down count leads to higher performance at the cost of higher power consumption, while a lower (more aggressive) idle power-down count leads to lower power consumption at the cost of lower performance. It would be desirable to more effectively balance power consumption and performance.

SUMMARY OF THE DISCLOSURE

Systems, methods, computer-readable media, and other examples are disclosed for dynamic power-down management in a computing device.

An exemplary method for controlling powering-down of a subsystem of a computing device may include determining a subsystem current consumption measurement, a subsystem bandwidth usage measurement, and a subsystem efficiency measurement. The exemplary method may also include determining an idle power-down count ("IPDC") value in response to the subsystem current consumption measurement, the subsystem bandwidth usage measurement, and the subsystem efficiency measurement using predetermined relations among subsystem current consumption, subsystem bandwidth usage, and subsystem efficiency. The exemplary method may further include powering down the subsystem in response to a determination of whether the subsystem is idle for an interval not less than a determined IPDC value.

An exemplary system for controlling powering-down of a subsystem of a computing device may include a processing system and a power controller. The processing system may be configured to determine a subsystem current consumption measurement, a subsystem bandwidth usage measurement, and a subsystem efficiency measurement. The processing system may further be configured to determine an IPDC value in response to the subsystem current consumption measurement, the subsystem bandwidth usage measurement, and the subsystem efficiency measurement using predetermined relations among subsystem current consumption, subsystem bandwidth usage, and subsystem efficiency. The power controller may be configured to power down the subsystem in response to a determination of whether the subsystem is idle for an interval not less than a determined IPDC value.

Another exemplary system for controlling powering-down of a subsystem of a computing device may include means for determining a subsystem current consumption measurement, a subsystem bandwidth usage measurement, and a subsystem efficiency measurement. The exemplary system may also include means for determining an IPDC value in response to the subsystem current consumption measurement, the subsystem bandwidth usage measurement, and the subsystem efficiency measurement using predetermined relations among subsystem current consumption, subsystem bandwidth usage, and subsystem efficiency. The exemplary system may further include means for powering down the subsystem in response to a determination of whether the subsystem is idle for an interval not less than a determined IPDC value.

An exemplary computer-readable medium controlling powering-down of a subsystem of a computing device may be provided. The computer-readable medium may comprise a non-transitory computer-readable medium having instructions stored thereon in computer-executable form. The instructions, when executed by a processing system of a computing device, may configure the processing system to determine a subsystem current consumption measurement, a subsystem bandwidth usage measurement, and a subsystem efficiency measurement. The instructions may further configure the processing system to determine an IPDC value in response to the subsystem current consumption measurement, the subsystem bandwidth usage measurement, and the subsystem efficiency measurement using predetermined relations among subsystem current consumption, subsystem bandwidth usage, and subsystem efficiency. The instructions may also configure the processing system to power down the subsystem in response to a determination of whether the subsystem is idle for an interval not less than a determined IPDC value.

BRIEF DESCRIPTION OF THE DRAWINGS

In the Figures, like reference numerals refer to like parts throughout the various views unless otherwise indicated. For reference numerals with letter character designations such as "101A" or "101B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

The word "exemplary" is used herein to mean "serving as an example, instance, or illustration." The word "illustrative" may be used herein synonymously with "exemplary." Any aspect described herein as "exemplary" is not necessarily to be construed as preferred or advantageous over other aspects.

Figure 1:
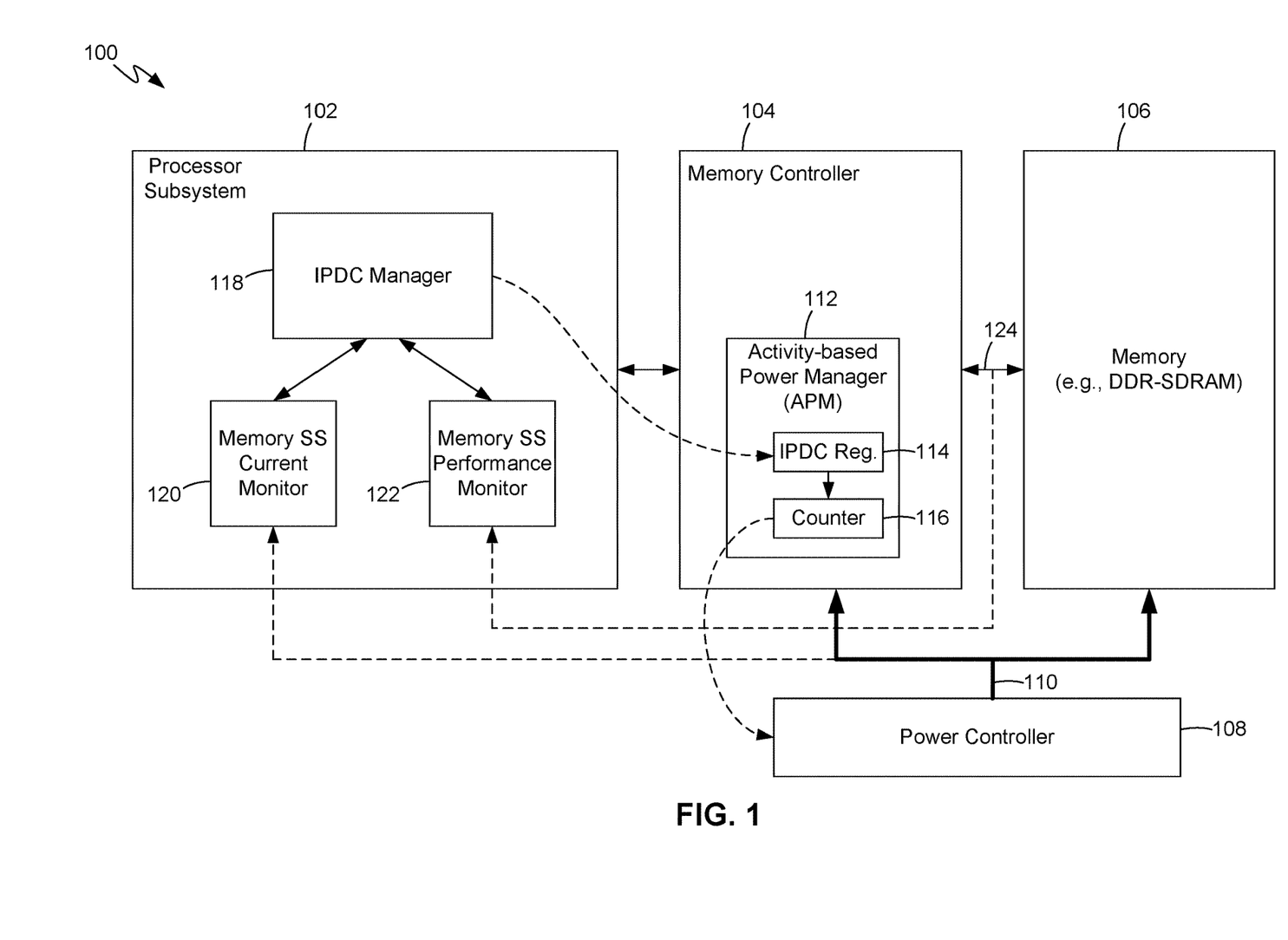
FIG. 1 is a block diagram illustrating a system for controlling powering-down of a subsystem of a computing device, in accordance with exemplary embodiments.

As shown in FIG. 1, in an illustrative or exemplary embodiment a system 100 may include a processor subsystem 102, a memory controller 104, and a memory 106. The memory 106 may be, for example, dynamic random access memory ("DRAM"), such as double data-rate synchronous DRAM ("DDR-SDRAM" or, for brevity, "DDR"). Accordingly, the memory controller 104 may be a DRAM (e.g., DDR) controller. The memory 106 and memory controller 104 may together be referred to as a memory subsystem. The memory subsystem may be one of any number of subsystems of a portable computing device or "PCD" (not shown in FIG. 1), which may be for example, a laptop or palmtop computer, a cellular telephone or smartphone, a personal digital assistant, a portable game console, a satellite telephone, etc.

As described below, the system 100 may be configured to power down the memory subsystem based on the extent to which the memory subsystem is idle or inactive. The system 100 may include a power controller 108 that may be configured to provide selected power supply voltage levels to the memory controller 104 and memory 106 via one or more power supply rails 110. As described below, powering down the memory subsystem may include the power controller 108 reducing the voltage level on a power supply rail 110. The system 100 may also be configured to power up the memory subsystem after it has been powered down, based on the extent to which the memory subsystem is no longer idle or inactive. Powering up the memory subsystem may include the power controller 108 increasing the voltage level on a power supply rail 110.

Although in the exemplary embodiment illustrated in FIG. 1 the system 100 may be configured to power down the memory subsystem based on the memory subsystem's idleness, in other embodiments (not shown) such a system may be configured to power down a different subsystem based on that subsystem's idleness. A system in accordance with the principles described herein may be configured to power down any one or more subsystems that consume power and are at times idle. How idleness is determined may depend upon the type of subsystem, as understood by one of ordinary skill in the art. Whether the subsystem is "idle" may, in some examples, be based on whether an indicator of activity exceeds a threshold. Also, unless otherwise indicated, the term "powering down" may include the subsystem entering any type of low-power or power-saving mode and is not limited to the subsystem being completely powered off in its entirety.

The memory controller 104 may include an activity-based power manager ("APM") 112. The APM 112 may include an idle power-down count ("IPDC") register 114 and a counter 116. As the memory controller 104 may include a processor or processing logic (not separately shown), the APM 112 may be implemented by the execution of software on such processing logic. Nevertheless, in some examples, some or all of the APM 112, such as the IPDC register 114, the counter 116, etc., may be implemented in hardware. The counter 116 may be configured to be loaded or otherwise provided with an initial count value from the IPDC register 114, and the counter 116 may be configured to count down (e.g., to zero) from the initial count value. When the counter 116 completes a full count (e.g., completes counting down from the initial count value to zero), the counter 116 signals the power controller 108. In response to this signal, indicating the counter 116 has completed a full count, the power controller 108 may power down the memory subsystem. It should be understood that the counter 116 and IPDC register 114, together configured to count down from a count value stored in the IPDC register 114, is only an example of how such counting logic may be implemented. For example, in other embodiments such counting logic may count upwards to the provided count value instead of downwards from the provided count value.

The APM 112 may be configured to monitor the activity (or stated conversely, the idleness) of the memory subsystem. If the APM 112 determines that the memory subsystem is active, i.e., not idle, the APM 112 may reload the counter 116 with the initial count value in the IPDC register 114. For example, the APM 112 may determine whether the subsystem is active by monitoring DRAM commands generated by the memory controller 104. It should be understood that in addition to being configured to perform or otherwise control the functions described herein relating to powering down the memory subsystem, the memory controller 104 may be configured to perform or otherwise control conventional functions relating to data storage in the memory 106, such as writing data to the memory 106 and reading data from the memory 106. The memory controller 104 may control writing data to the memory 106 and reading data from the memory 106 in response to memory transaction requests received from a processor, such as, for example, the processor subsystem 102. As understood by one of ordinary skill in the art, in response to such memory transaction requests the memory controller 104 may generate DRAM commands and provide the DRAM commands to the DRAM 106.

In the illustrated embodiment, in a powered-down state the memory subsystem may no longer be enabled to complete memory transactions. Nevertheless, in some embodiments there may be a low-power "powered down" state in which the memory subsystem may still be enabled to perform some operations. For example, in such a low-power "powered down" state the memory subsystem may be enabled to perform memory transactions but to a more limited extent than in a higher-power "powered up" state. Alternatively, or in addition, in such a low-power "powered down" state the memory subsystem may continue to perform refresh operations to maintain stored data but may not be enabled to perform memory transactions.

In the exemplary embodiment, the APM 112 may determine whether the memory subsystem is active by monitoring the DRAM commands that the memory controller 104 generates. For example, the APM 112 may monitor for the DRAM command commonly known as Activate or "ACT." When the APM 112 detects that the memory controller 104 has generated an ACT command, the APM 112 may reload the counter 116 with the initial count value in the IPDC register 114. Accordingly, if the APM 112 detects an ACT command within an interval equal to the full count, the counter 116 will be reloaded with the initial count value and begin counting downward again from the initial count value. However, if the APM 112 does not detect an ACT command within an interval equal to the full count, the counter 116 will not be reloaded before reaching the full count and therefore, upon reaching the full count, will signal the power controller 108 to power down the memory subsystem. Stated another way, the memory controller 104 and power controller 108 are together configured to power down the memory subsystem in response to a determination that the memory subsystem has been idle for an interval of the full count.

If the initial count value were a constant or fixed value, which may be referred to as a "static IPDC," it may be challenging to select a static IPDC that balances power savings and performance across a range of operating conditions. A higher (more conservative) static IPDC may lead to higher performance at the cost of higher power consumption, while a lower (more aggressive) static IPDC may lead to lower power consumption at the cost of lower performance. A solution described herein relates to determining an initial count value based on real-time operating conditions. That is, instead of loading the counter 116 with a static IPDC as the initial count value, a "dynamic IPDC" may be determined based on real-time operating conditions of the memory subsystem. These conditions may include the amount of current consumed by the memory subsystem, the amount of bandwidth used by the memory subsystem, and the memory subsystem efficiency.

In the illustrated embodiment, the processor subsystem 102 may be configured to determine the dynamic IPDC. Nevertheless, in other embodiments another processor (not shown), the memory controller 104 or portion therefore (e.g., APM 112), or other component or components may be configured to determine the dynamic IPDC. In the illustrated embodiment, the processor subsystem 102 may include an IPDC manager 118, a memory subsystem ("SS") current monitor 120, and a memory subsystem performance monitor 122. The IPDC manager 118, the memory subsystem performance monitor 122, and the memory subsystem current monitor 120 may be implemented by the execution of software on the processor subsystem 102. Analog-to-digital conversion circuitry that converts analog current measurements into digital values may be provided but is not separately shown for purposes of clarity.

The memory subsystem performance manager 122 may be configured to monitor traffic on the memory bus 124 between the memory controller 104 and the memory 106 and may be configured to detect DRAM commands and other memory bus traffic. Based such detected DRAM commands, the memory subsystem performance manager 122 may be configured to alert the IPDC manager 118 each time the memory subsystem performance manager 122 detects that a memory transaction is performed. The memory subsystem performance manager 122 may be configured to measure or determine the amount of bandwidth being utilized by the memory subsystem for the memory transaction. Determining the amount of bandwidth being used by the memory subsystem may include determining the amount of data per unit time (e.g., bytes per second) being transferred to or from the memory 106 in association with a memory transaction. The memory subsystem performance manager 122 may determine this bandwidth, i.e., collect a memory subsystem bandwidth usage measurement, each time a memory transaction is detected. The memory subsystem performance manager 122 may thus collect some number (N) of memory subsystem bandwidth usage measurements over N memory transactions.

The memory subsystem performance manager 122 also may be configured to determine the memory subsystem efficiency during each of the above-referenced N memory transactions. As understood by one of ordinary skill in the art, memory subsystem efficiency may be measured or determined by dividing the number of memory data cycles during the transaction by the number of memory busy cycles during the transaction. The memory subsystem performance manager 122 may thus collect N memory subsystem efficiency measurements over N memory transactions.

The memory subsystem current monitor 120 may be configured to monitor the current on the power supply rail 110 powering the memory controller 104 and the memory 106. The memory subsystem current monitor 120 may be configured to measure or determine the amount of current being consumed by the memory controller 104 and the memory 106 during each of the above-referenced N memory transactions. The memory subsystem current monitor 120 may thus collect N current consumption measurements over N memory transactions.

The IPDC manager 118 may determine an IPDC value in response to one or more of the memory current consumption measurements, one or more of the memory bandwidth usage measurements, and one or more of the memory subsystem efficiency measurements. In determining the IPDC value, the IPDC manager 118 may use predetermined relations among memory subsystem current consumption, subsystem bandwidth usage, and subsystem efficiency. The predetermined relations may include, for example: a first relation between IPDC and memory subsystem current consumption, a second relation between memory subsystem current consumption measurement and memory subsystem bandwidth usage, and a third relation between memory subsystem bandwidth usage and memory subsystem efficiency. The first relation, second relation, and third relation may be, for example, polynomial equations.

The first relation may be, for example, the following fifth-order polynomial equation:

$$y=a_1x^5+a_2x^4+a_3x^3+a_4x^2+a_5x+c_1, \tag{Eq. 1}$$

where x is the IPDC value, y is memory subsystem current consumption, $a_1$, $a_2$, $a_3$, $a_4$, and $a_5$ are coefficients, and $c_1$ is a constant.

The second relation may be, for example, the following fourth-order polynomial equation:

$$z=b_1y^4+b_2y^3+b_3y^2+b_4y+c_2, \tag{Eq. 2}$$

where z is memory subsystem bandwidth usage, $b_1$, $b_2$, $b_3$, and $b_4$ are coefficients, and $c_2$ is a constant.

The third relation may be, for example, the following third-order polynomial equation:

$$p=d_1z^3+d_2z^2+d_3z+c_3, \tag{Eq. 3}$$

where p is memory subsystem efficiency, $d_1$, $d_2$, and $d_3$ are coefficients, and $c_3$ is a constant.

Determining the IPDC value x using the three above-described polynomial equations may include determining a memory subsystem current consumption value (i.e., a value of y), a memory subsystem bandwidth usage value (i.e., a value of z), and a memory subsystem efficiency value (i.e., a value of p), and solving the system of three polynomial equations for x using those values of y, z and p. As understood by one of ordinary skill in the art, any of various known techniques may be used to solve such a system of polynomial equations. The Newton-Raphson method is an example of one such technique.

The IPDC manager 118 may be configured to determine an IPDC value every N memory transactions, i.e., at intervals of N memory transactions. Determining the IPDC value may include determining the IPDC value using the N memory subsystem bandwidth usage measurements, the N memory subsystem efficiency measurements, and the N memory subsystem current consumption measurements. For example, the IPDC manager 118 may use a histogram method to determine the most common (i.e., the most frequently occurring) memory subsystem bandwidth usage measurement among the N memory subsystem bandwidth usage measurements, the most common memory subsystem efficiency measurement among the N memory subsystem efficiency measurements, and the most common memory subsystem current consumption measurement among the N memory subsystem current consumption measurements. Then, using the most common memory subsystem current consumption measurement as the above-referenced memory subsystem current consumption value y, the most common memory subsystem bandwidth measurement as the above-referenced memory subsystem bandwidth value z, and the most common memory subsystem efficiency measurement as the memory subsystem efficiency value p, the IPDC manager 118 may determine the IPDC value x using the predetermined relations among memory subsystem current consumption, memory subsystem bandwidth usage, and memory subsystem efficiency. For example, the IPDC manager 118 may be configured to solve the above-described system of three polynomial equations to obtain the IPDC value x. The IPDC manager 118 may then program the IPDC register 114 with the IPDC value x.

Although in the exemplary embodiment (FIG. 1) the IPDC manager 118 of the processor subsystem 102 is configured to solve the above-described system of three polynomial equations to determine the IPDC value x, in other embodiments (not shown) another processing subsystem may determine the IPDC value, or the IPDC value may be determined in another manner. For example, the APM 112 or other portion of the memory controller 104 may be configured to calculate or otherwise determine the IPDC value.

Figure 2:
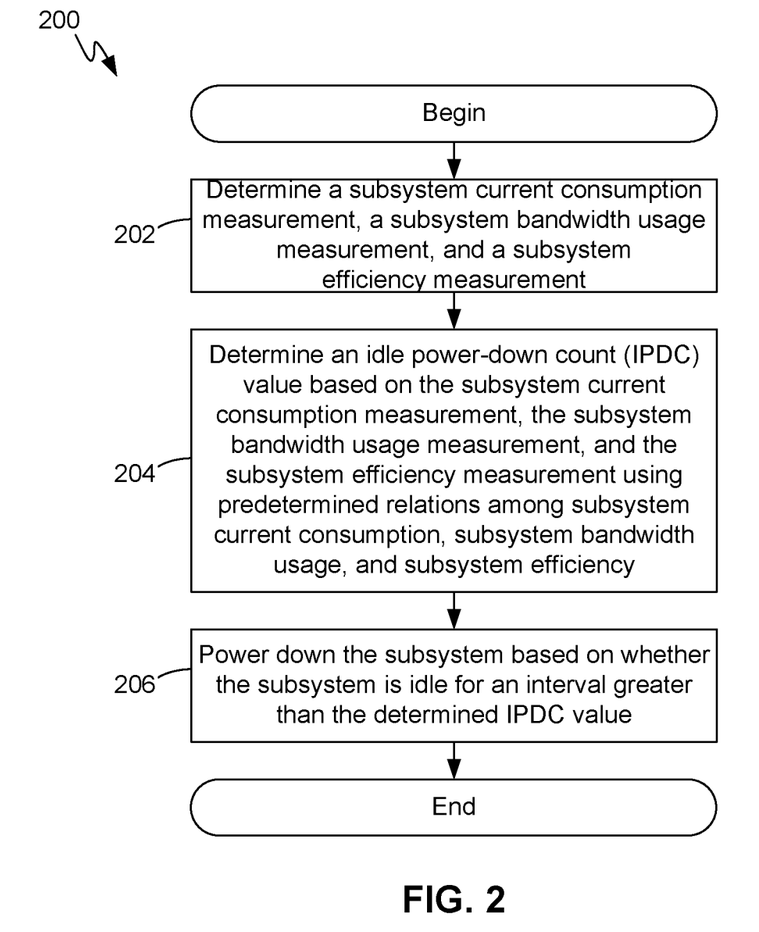
FIG. 2 is a flow diagram illustrating a method for controlling powering-down of a subsystem of a computing device, in accordance with exemplary embodiments.

In FIG. 2, a method 200 for controlling powering-down of a subsystem of a portable computing device or "PCD" is illustrated. The method 200 may include the following. As indicated by block 202, the method 200 may include determining a subsystem current consumption measurement, a subsystem bandwidth usage measurement, and a subsystem efficiency measurement. The above-described IPDC manager 118, memory subsystem current monitor 120, and memory subsystem performance monitor 122 may be configured to control these aspects of the method 200. The IPDC manager 118 and the memory subsystem current monitor 120 may be an example of a means for determining the subsystem current consumption measurement. The IPDC manager 118 and the memory subsystem performance monitor 122 may be an example of a means for determining the subsystem bandwidth usage measurement and the subsystem efficiency measurement.

As indicated by block 204, the method 200 may include determining an IPDC value in response to one or more subsystem current consumption measurements, one or more subsystem bandwidth usage measurements, and one or more subsystem efficiency measurements, using predetermined relations among subsystem current consumption, subsystem bandwidth usage, and subsystem efficiency. The IPDC manager 118 may be an example of a means for determining the IPDC value in response to the subsystem current consumption measurements, the subsystem bandwidth usage measurements, and the subsystem efficiency measurements using predetermined relations among subsystem current consumption, subsystem bandwidth usage, and subsystem efficiency.

As indicated by block 206, the method 200 may include powering down the subsystem based on a determination of whether the subsystem is idle for an interval not less than the determined (block 204) IPDC value. The APM 112 and the power controller 108 may be an example of a means for powering down the subsystem in response to a determination of whether the subsystem is idle for an interval not less than the determined IPDC value. Although in the illustrated embodiment (FIG. 1), the processor subsystem 102 and memory controller 104 are configured to perform or control the method 200, in other embodiments other types of processing systems may be configured to control the method 200.

Figure 3:
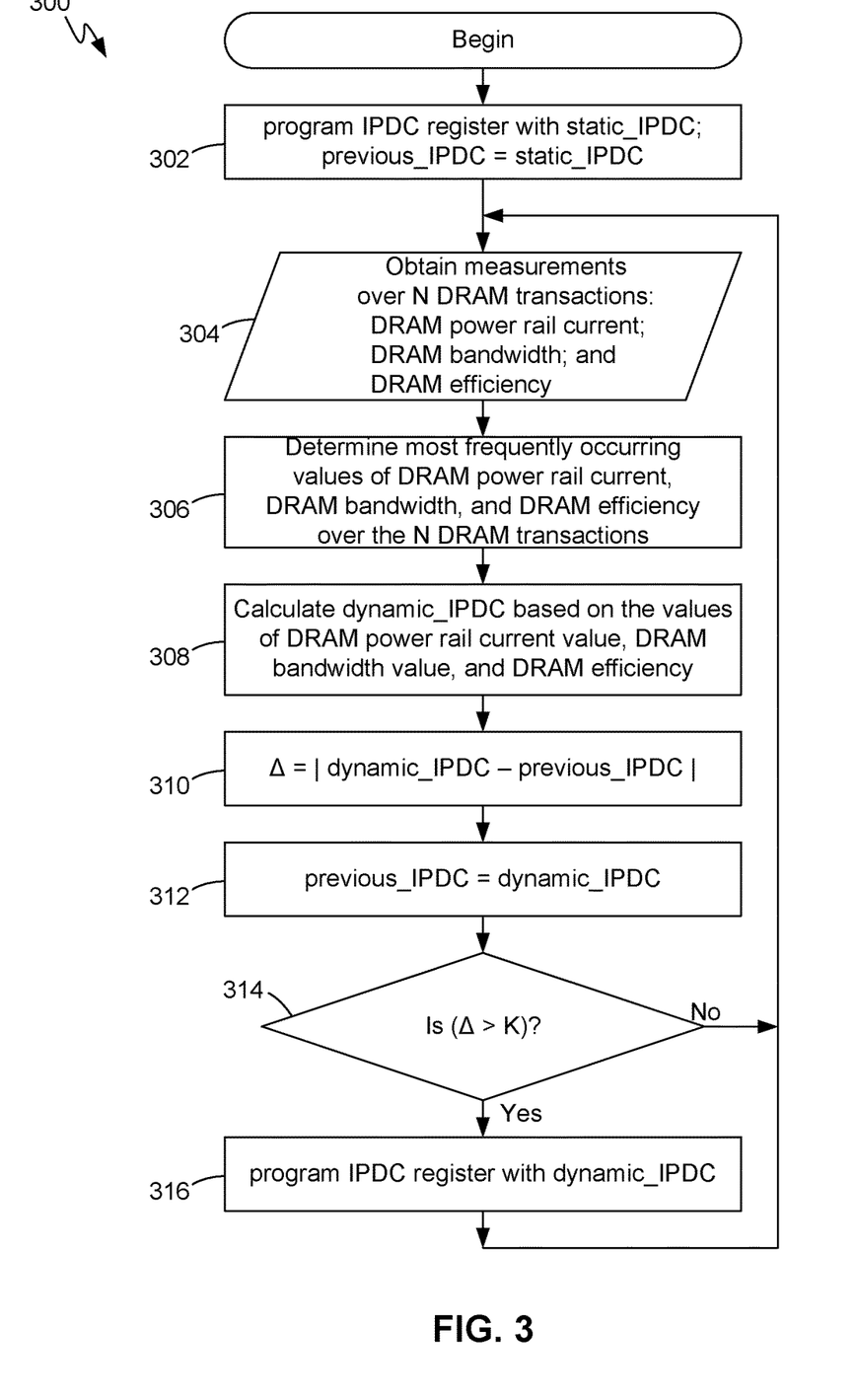
FIG. 3 is a flow diagram illustrating another method for controlling powering-down of a subsystem of a computing device, in accordance with exemplary embodiments.

In FIG. 3, a method 300 for controlling powering-down of a subsystem of a PCD is illustrated. The method 300 may include the following. As indicated by block 302, the method 300 may begin with initializing the IPDC register 114 (FIG. 1) by storing a static IPDC value ("static_IPDC") in the IPDC register 114. The static IPDC value is a constant or fixed value that does not change during operation of the PCD. As indicated by block 304, the method 300 may include obtaining for each of N memory (e.g., DRAM) transactions: a DRAM subsystem current consumption measurement, a DRAM subsystem bandwidth usage measurement, and a DRAM subsystem efficiency measurement.

As indicated by block 306, the method 300 may include determining the most common (i.e., the most frequently occurring) DRAM subsystem current consumption measurement among the N DRAM subsystem current consumption measurements, the most common DRAM subsystem bandwidth usage measurement among the N DRAM subsystem bandwidth usage measurements, and the most common DRAM subsystem efficiency measurement among the N DRAM subsystem efficiency measurements. Determining these most common measurements or values may include using a histogram technique.

As indicated by block 308, the method 300 may include calculating a dynamic IPDC value ("dynamic_IPDC") based on the most common values of DRAM subsystem current consumption, DRAM subsystem bandwidth usage, and DRAM subsystem efficiency determined in accordance with block 306. Calculating the dynamic IPDC value may including solving a system of polynomial equations, as described above.

As indicated by block 310, the method 300 may include determining a change or delta between the calculated or dynamic IPDC value and a previous IPDC value: $\Delta = |\text{dynamic\_IPDC} - \text{previous\_IPDC}|$. Note that the delta may be the absolute value of the difference between the dynamic IPDC value and the previous IPDC value. Initially (i.e., the first time the dynamic IPDC value is calculated in accordance with block 308), the previous IPDC value may be the above-described static IPDC value. (This initialization of the value of previous_IPDC to the value of static_IPDC may be performed in association with block 302). For each subsequent time the dynamic IPDC value is calculated, the previous_IPDC value may be assigned the calculated dynamic_IPDC value, as indicated by block 312.

As indicated by block 314, the method 300 may include determining whether the above-referenced delta between the calculated or dynamic IPDC value and the previous IPDC value is greater than a threshold K. The threshold K may be a constant or fixed value. If it is determined (block 314) that the delta is not greater than the threshold K, the method 300 may return to the above-described block 304, where measurements may again be obtained over N DRAM transactions. The actions described above with regard to blocks 304-314 may be repeated every N DRAM transactions.

If it is determined (block 314) that the delta is greater than the threshold K, then the IPDC register 114 (FIG. 1) may be re-programmed by storing the calculated or dynamic IPDC value ("dynamic_IPDC") in the IPDC register 114, as indicated by block 316. The method 300 may then return to the above-described block 304.

Figure 4:
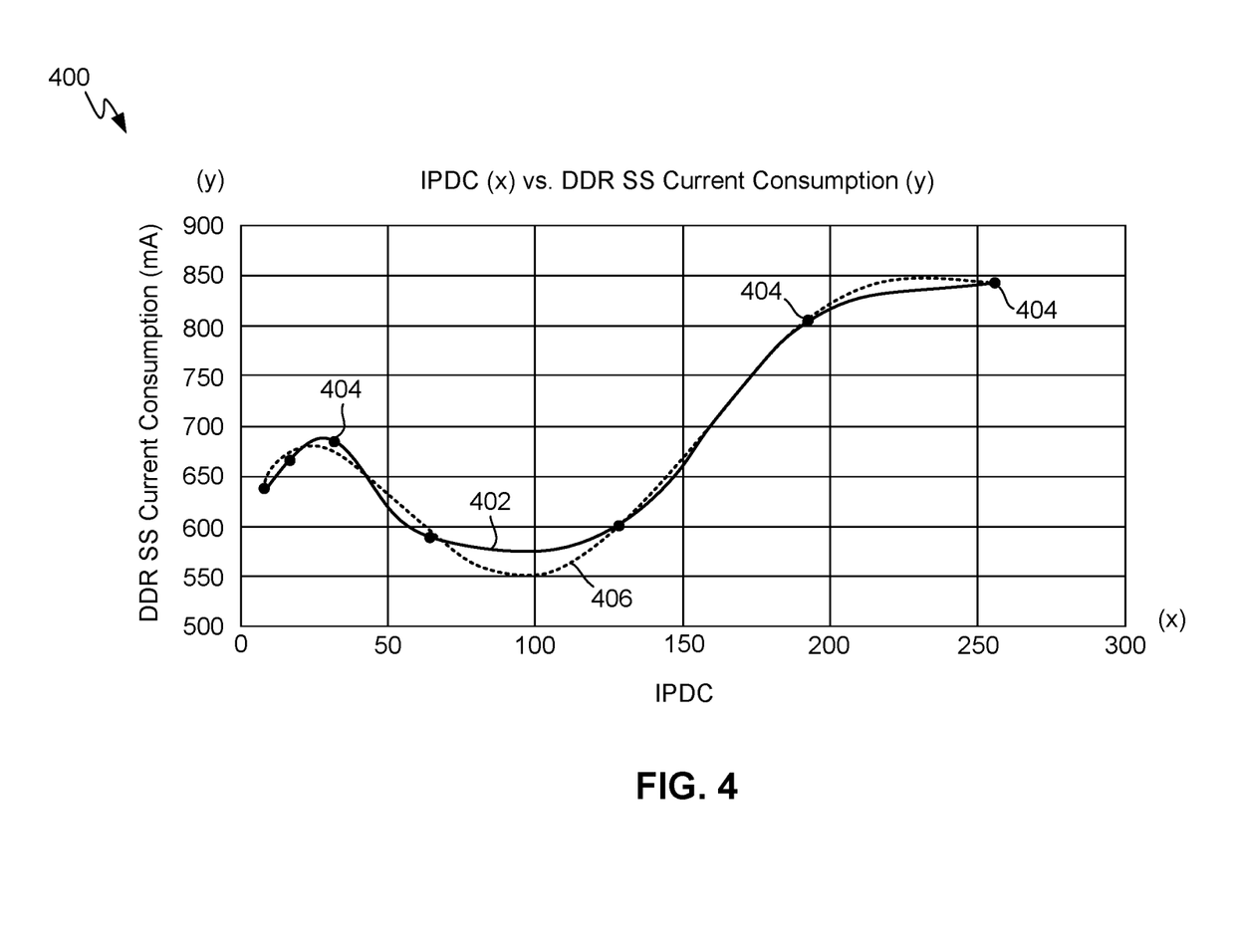
FIG. 4 is a plot of idle power-down count ("IPDC") versus exemplary subsystem current consumption data points.

In FIG. 4 an exemplary plot 400 of IPDC values versus DDR subsystem current consumption is illustrated. The plot 400 shows a curve 402 (in solid line) that is fit to data points 404. The plot 400 also shows a curve 406 (in broken line) that is a polynomial approximation of the curve 402. In the illustrated example, the polynomial equation may be:

$$y = 1E^{-8}x^5 - 9E^{-6}x^4 + 0.0025x^3 - 0.2494x^2 - 8.1243x + 597.7 \quad \text{(Eq. 4)}$$

In Equation 4, the coefficient $1E^{-8}$ is an example of the coefficient a1 in the Equation 1 above, the coefficient $-9E^{-6}$ is an example of the coefficient a2 in Equation 1, the coefficient 0.0025 is an example of the coefficient a3 in Equation 1, the coefficient $-0.2494$ is an example of the coefficient a4 in Equation 1, the coefficient $-8.1243$ is an example of the coefficient a5 in Equation 1, and the number 597.7 is an example of the constant c1 in Equation 1. The data points 404 may be gathered, and the polynomial approximation may be determined from the data points 404, prior to operation of the PCD. For example, the manufacturer of the PCD or a portion thereof (e.g., a system-on-chip containing the IPDC manager 118) may gather the data points 404 and determine the polynomial approximation before the PCD is provided to an end-user. The DDR subsystem may be operated in a data gathering mode, independently of other PCD functions (e.g., using a software tool controlled by a human operator). The data points 404 may be gathered by operating the DDR subsystem over a number of transactions. The data gathering mode may enable direct access (via the software tool) to programming the IPDC register 114 (FIG. 1) with any desired value, i.e., bypassing that function of the IPDC manager 118. The IPDC value programmed into the IPDC register 114 (FIG. 1) may be varied over those transactions, and the corresponding DDR subsystem current consumption may be measured in each of those transactions to provide a data point 504.

Figure 5:
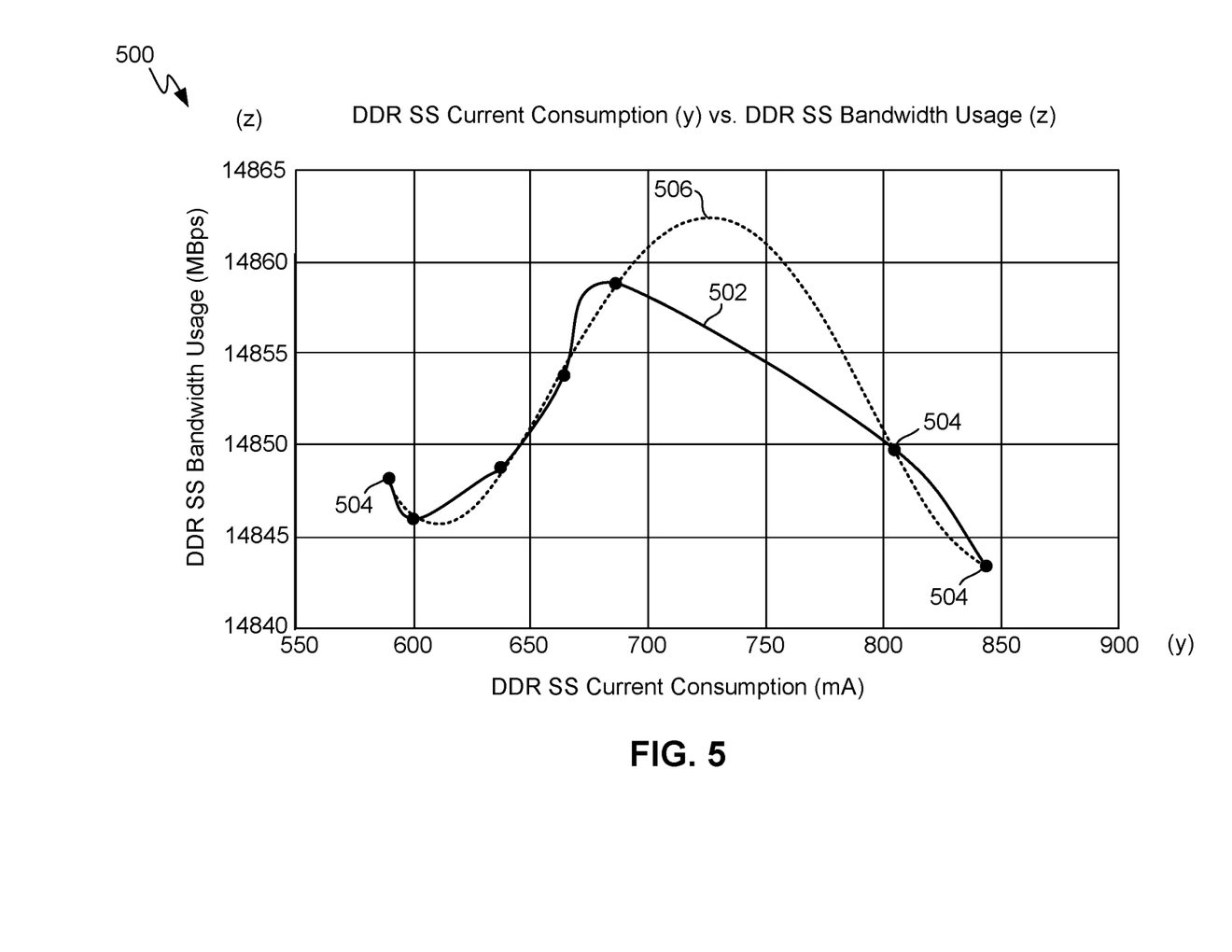
FIG. 5 is a plot of exemplary subsystem current consumption versus exemplary subsystem bandwidth data points.

In FIG. 5 an exemplary plot 500 of DDR subsystem current consumption versus DDR subsystem bandwidth usage is illustrated. The plot 500 shows a curve 502 (in solid line) that is fit to data points 504. The plot 500 also shows a curve 506 (in broken line) that is a polynomial approximation of the curve 502. In the illustrated example, the polynomial equation may be:

$$z = 9E^{-8}y^4 - 0.0003y^3 + 0.286y^2 - 136.28y + 38983 \quad \text{(Eq. 5)}$$

In Equation 5, the coefficient $9E^{-8}$ is an example of the coefficient b1 in the Equation 2 above, the coefficient $-0.0003$ is an example of the coefficient b2 in Equation 2, the coefficient 0.286 is an example of the coefficient b3 in Equation 2, the coefficient $-136.28$ is an example of the coefficient b4 in Equation 2, and the number 38983 is an example of the constant c2 in Equation 2. The data points 504 may be gathered, and the polynomial approximation may be determined from the data points 504, prior to operation of the PCD. The data points 504 may be gathered by operating the DDR subsystem over a number of transactions, as described above. The IPDC value programmed into the IPDC register 114 (FIG. 1) may be varied over those transactions, and the DDR subsystem current consumption and DDR subsystem bandwidth, together providing a data point 504, may be measured in each of those transactions.

Figure 6:
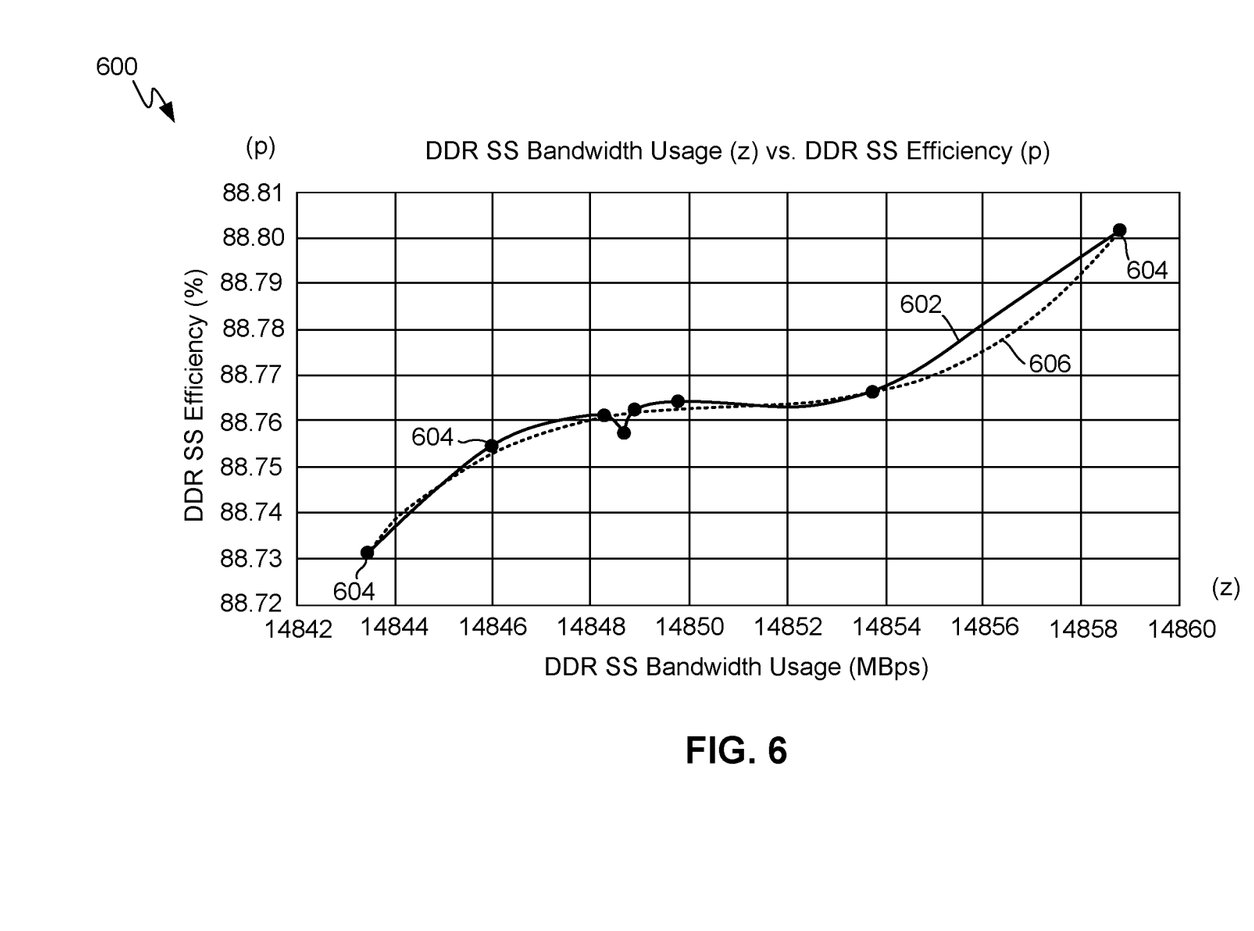
FIG. 6 is a plot of exemplary subsystem bandwidth versus exemplary subsystem efficiency data points.

In FIG. 6 an exemplary plot 600 of DDR subsystem bandwidth usage versus DDR subsystem efficiency is illustrated. The plot 600 shows a curve 602 (in solid line) that is fit to data points 604. The plot 600 also shows a curve 606 (in broken line) that is a polynomial approximation of the curve 602. In the illustrated example, the polynomial equation may be:

$$z = 7E^{-5}y^3 - 3.0718y^2 + 45619y - 2E^8 \quad \text{(Eq. 6)}$$

In Equation 6, the coefficient $7E^{-5}$ is an example of the coefficient d1 in the Equation 3 above, the coefficient $-3.0718$ is an example of the coefficient d2 in Equation 3, the coefficient 45619 is an example of the coefficient d3 in Equation 3, and the number $-2E^8$ is an example of the constant c3 in Equation 3. The data points 604 may be gathered, and the polynomial approximation may be determined from the data points 604, prior to operation of the PCD. The data points 604 may be gathered by operating the DDR subsystem over a number of transactions, as described above. The IPDC value programmed into the IPDC register 114 (FIG. 1) may be varied over those transactions, and the DDR subsystem bandwidth and DDR subsystem efficiency, together providing a data point 604, may be measured in each of those transactions.

After the polynomial approximations (i.e., equations) are determined in the manner described above, their coefficients and constants may be stored for later use by the IPDC manager 118 (FIG. 1). The polynomial approximations (or coefficients and constants thereof) may be stored, for example, in a non-volatile memory (not shown) of the processor subsystem 102, accessible to the IPDC manager 118. Then, when the PCD is being operated in its normal operational mode by an end-user, the IPDC manager 118 may access this stored polynomial equation information to perform the computations described above with regard to the methods 200 (FIG. 2) and 300 (FIG. 3).

Figure 7:
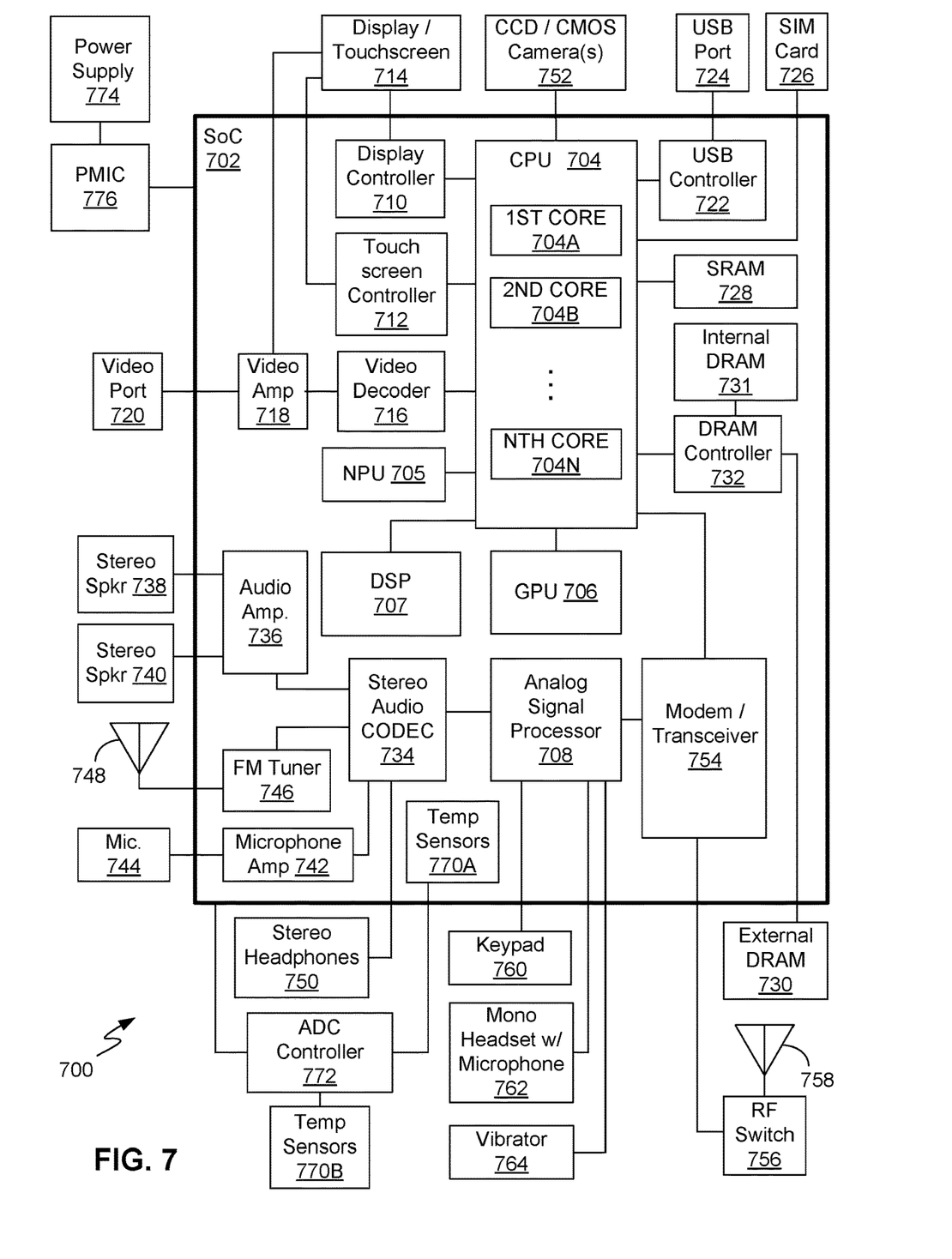
FIG. 7 is block diagram of a portable computing device, in accordance with exemplary embodiments.

FIG. 7 illustrates an example of a PCD 700, such as a mobile phone or smartphone, in which exemplary embodiments of systems, methods, computer-readable media, and other examples of controlling powering-down of a PCD subsystem may be provided. Other examples of a PCD (not shown) in which embodiments of such systems, methods, computer-readable media, etc., may be provided include a laptop computer, a tablet computer, a smartbook, a satellite telephone, a navigation device, a portable game console, a personal digital assistant ("PDA"), etc. For purposes of clarity, some data buses, interconnects, signals, etc., are not shown in FIG. 7.

The PCD 700 may include an SoC 702. The SoC 702 may include a central processing unit ("CPU") 704, a neural processing unit ("NPU") 705, a graphics processing unit ("GPU") 706, a digital signal processor ("DSP") 707, an analog signal processor 708, a modem/modem subsystem 754, or other processors. The CPU 704 may include one or more CPU cores, such as a first CPU core 704A, a second CPU core 704B, etc., through an Nth CPU core 704N. The CPU 704 may be an example of the processor subsystem 102 described above with regard to FIG. 1.

A display controller 710 and a touch-screen controller 712 may be coupled to the CPU 704. A touchscreen display 714 external to the SoC 702 may be coupled to the display controller 710 and the touch-screen controller 712. The PCD 700 may further include a video decoder 716 coupled to the CPU 704. A video amplifier 718 may be coupled to the video decoder 716 and the touchscreen display 714. A video port 720 may be coupled to the video amplifier 718. A universal serial bus ("USB") controller 722 may also be coupled to CPU 704, and a USB port 724 may be coupled to the USB controller 722. A subscriber identity module ("SIM") card 726 may also be coupled to the CPU 704.

One or more memories may be coupled to the CPU 704. The one or more memories may include both volatile and non-volatile memories. Examples of volatile memories include static random access memory ("SRAM") 728 and dynamic random access memory ("DRAM") 730 and 731. Such memories may be external to the SoC 702, such as the DRAM 730, or internal to the SoC 702, such as the DRAM 731. A DRAM controller 732 coupled to the CPU 704 may control the writing of data to, and reading of data from, the DRAMs 730 and 731. The DRAM controller 732 may be an example of the memory controller 104 described above with regard to FIG. 1, and the DRAM 730 or 731 may be an example of the memory 106.

A stereo audio CODEC 734 may be coupled to the analog signal processor 708. Further, an audio amplifier 736 may be coupled to the stereo audio CODEC 734. First and second stereo speakers 738 and 740, respectively, may be coupled to the audio amplifier 736. In addition, a microphone amplifier 742 may be coupled to the stereo audio CODEC 734, and a microphone 744 may be coupled to the microphone amplifier 742. A frequency modulation ("FM") radio tuner 746 may be coupled to the stereo audio CODEC 734. An FM antenna 748 may be coupled to the FM radio tuner 746. Further, stereo headphones 750 may be coupled to the stereo audio CODEC 734. Other devices that may be coupled to the CPU 704 include one or more digital (e.g., CCD or CMOS) cameras 752.

The modem or RF transceiver 754 may be coupled to the analog signal processor 708 and the CPU 704. An RF switch 756 may be coupled to the RF transceiver 754 and an RF antenna 758. In addition, a keypad 760, a mono headset with a microphone 762, and a vibrator device 764 may be coupled to the analog signal processor 708.

The SoC 702 may have one or more internal or on-chip thermal sensors 770A and may be coupled to one or more external or off-chip thermal sensors 770B. An analog-to-digital converter controller 772 may convert voltage drops produced by the thermal sensors 770A and 770B to digital signals. A power supply 774 and a PMIC 776 may supply power to the SoC 702.

Firmware or software may be stored in any of the above-described memories, such as the DRAM 730 or 731, SRAM 728, etc., or may be stored in a local memory directly accessible by the processor hardware on which the software or firmware executes. Execution of such firmware or software may control aspects of any of the above-described methods or configure aspects any of the above-described systems. Any such memory or other non-transitory storage medium having firmware or software stored therein in computer-readable form for execution by processor hardware may be an example of a "computer-readable medium," as the term is understood in the patent lexicon.

Implementation examples are described in the following numbered clauses.

1. A method for controlling powering-down of a subsystem of a computing device, comprising:
    determining, by a processing system, a subsystem current consumption measurement, a subsystem bandwidth usage measurement, and a subsystem efficiency measurement;
    determining, by the processing system, an idle power-down count value in response to the subsystem current consumption measurement, the subsystem bandwidth usage measurement, and the subsystem efficiency measurement using a plurality of predetermined relations among subsystem current consumption, subsystem bandwidth usage, and subsystem efficiency; and
    powering down the subsystem in response to a determination of whether the subsystem is idle for an interval not less than a determined idle power-down count value.

2. The method of clause 1, wherein determining the idle power-down count value comprises determining a most common subsystem current consumption measurement from among a plurality of subsystem current consumption measurements, a most common subsystem bandwidth usage measurement from among a plurality of subsystem bandwidth usage measurements, and a most common subsystem efficiency measurement from among a plurality of subsystem efficiency measurements.

3. The method of clause 1 or 2, wherein the subsystem comprises a dynamic random access memory subsystem.

4. The method of any of clauses 1-3, wherein the plurality of predetermined relations include a first relation between idle power-down count and subsystem current consumption, a second relation between subsystem current consumption measurement and subsystem bandwidth usage, and a third relation between subsystem bandwidth usage and subsystem efficiency.

5. The method of any of clauses 1-4, wherein the first relation is a fifth-order polynomial equation, the second relation is a fourth-order polynomial equation, and the third relation is a third-order polynomial equation, and determining the idle power-down count value comprises solving a system of polynomial equations.

6. The method of any of clauses 1-5, wherein powering down the subsystem comprises:
    determining whether a difference between the determined idle power-down count value and a previous idle power-down count value exceeds a threshold;
    powering down the subsystem when the subsystem is idle for an interval not less than the determined idle power-down count value and when the difference between the determined idle power-down count value and the previous idle power-down count value exceeds the threshold; and
    powering down the subsystem when the subsystem is idle for an interval not less than the previous idle power-down count value and when the difference between the determined idle power-down count value and the previous idle power-down count value does not exceed the threshold.

7. The method of clause 6, wherein powering down the subsystem further comprises:
- providing counting logic with the determined idle power-down count value when the difference between the determined idle power-down count value and the previous idle power-down count value exceeds the threshold;
- providing the counting logic with the previous idle power-down count value when the difference between the determined idle power-down count value and the previous idle power-down count value does not exceed the threshold;
- resetting the counting logic when the subsystem is active; and
- powering down the subsystem when the counting logic counts a provided number of clock cycles while the subsystem is inactive.

8. A system for controlling powering-down of a subsystem of a computing device, comprising:
- a processing system configured to:
  - determine a subsystem current consumption measurement, a subsystem bandwidth usage measurement, and a subsystem efficiency measurement;
  - determine an idle power-down count value in response to the subsystem current consumption measurement, the subsystem bandwidth usage measurement, and the subsystem efficiency measurement using a plurality of predetermined relations among subsystem current consumption, subsystem bandwidth usage, and subsystem efficiency; and
- a power controller configured to power down the subsystem in response to a determination of whether the subsystem is idle for an interval not less than a determined idle power-down count value.

9. The system of clause 8, wherein the processing system is configured to determine the determined idle power-down count value by being configured to determine a most common subsystem current consumption measurement from among a plurality of subsystem current consumption measurements, a most common subsystem bandwidth usage measurement from among a plurality of subsystem bandwidth usage measurements, and a most common subsystem efficiency measurement from among a plurality of subsystem efficiency measurements.

10. The system of clause 8 or 9, wherein the subsystem comprises a dynamic random access memory subsystem.

11. The system of any of clauses 8-10, wherein the plurality of predetermined relations include a first relation between idle power-down count and subsystem current consumption, a second relation between subsystem current consumption measurement and subsystem bandwidth usage, and a third relation between subsystem bandwidth usage and subsystem efficiency.

12. The system of any of clauses 8-11, wherein the first relation is a fifth-order polynomial equation, the second relation is a fourth-order polynomial equation, and the third relation is a third-order polynomial equation, and determining the determined idle power-down count value comprises solving a system of polynomial equations.

13. The system of any of clauses 8-12, wherein the processing system and the power controller are configured to power down the subsystem by being configured to:
- determine whether a difference between the determined idle power-down count value and a previous idle power-down count value exceeds a threshold;
- power down the subsystem when the subsystem is idle for an interval not less than the determined idle power-down count value and when the difference between the determined idle power-down count value and the previous idle power-down count value exceeds the threshold; and
- power down the subsystem when the subsystem is idle for an interval not less than the previous idle power-down count value and when the difference between the determined idle power-down count value and the previous idle power-down count value does not exceed the threshold.

14. The system of clause 13, wherein the processing system and the power controller are configured to power down the subsystem by being further configured to:
- provide counting logic with the determined idle power-down count value when the difference between the determined idle power-down count value and the previous idle power-down count value exceeds the threshold;
- provide the counting logic with the previous idle power-down count value when the difference between the determined idle power-down count value and the previous idle power-down count value does not exceed the threshold;
- reset the counting logic when the subsystem is active; and
- power down the subsystem when the counting logic counts a provided number of clock cycles while the subsystem is inactive.

15. The system of any of clauses 8-14, wherein the computing device comprises one of: a smartphone, a laptop computer, a tablet computer, a smartbook, a satellite telephone, a navigation device, a portable game console, or a personal digital assistant.

16. A system for controlling powering-down of a subsystem of a computing device, comprising:
- means for determining a subsystem current consumption measurement, a subsystem bandwidth usage measurement, and a subsystem efficiency measurement;
- means for determining an idle power-down count value in response to the subsystem current consumption measurement, the subsystem bandwidth usage measurement, and the subsystem efficiency measurement using a plurality of predetermined relations among subsystem current consumption, subsystem bandwidth usage, and subsystem efficiency; and
- means for powering down the subsystem in response to a determination of whether the subsystem is idle for an interval not less than a determined idle power-down count value.

17. The system of clause 16, wherein the means for determining the idle power-down count value comprises means for determining a most common subsystem current consumption measurement from among a plurality of subsystem current consumption measurements, a most common subsystem bandwidth usage measurement from among a plurality of subsystem bandwidth usage measurements, and a most common subsystem efficiency measurement from among a plurality of subsystem efficiency measurements.

18. The system of clause 16 or 17, wherein the subsystem comprises a dynamic random access memory subsystem.

19. The system of any of clauses 16-18, wherein the plurality of predetermined relations include a first relation between idle power-down count and subsystem current consumption, a second relation between subsystem current consumption measurement and subsystem bandwidth usage, and a third relation between subsystem bandwidth usage and subsystem efficiency.

20. The system of any of clauses 16-19, wherein the first relation is a fifth-order polynomial equation, the second relation is a fourth-order polynomial equation, and the third relation is a third-order polynomial equation, and determining the idle power-down count value comprises solving a system of polynomial equations.

21. The system of any of clauses 16-20, wherein the means for powering down the subsystem comprises:
means for determining whether a difference between the determined idle power-down count value and a previous idle power-down count value exceeds a threshold;
means for powering down the subsystem when the subsystem is idle for an interval not less than the determined idle power-down count value and when the difference between the determined idle power-down count value and the previous idle power-down count value exceeds the threshold, and for powering down the subsystem when the subsystem is idle for an interval not less than the previous idle power-down count value and when the difference between the determined idle power-down count value and the previous idle power-down count value does not exceed the threshold.

22. The system of clause 21, wherein the means for powering down the subsystem further comprises:
means for providing counting logic with the determined idle power-down count value when the subsystem difference between the determined idle power-down count value and the previous idle power-down count value exceeds the threshold;
means for providing the counting logic with the previous idle power-down count value when the difference between the determined idle power-down count value and the previous idle power-down count value does not exceed the threshold;
means for resetting the counting logic when the subsystem is active; and
means for powering down the subsystem when the counting logic counts a provided number of clock cycles while the subsystem is inactive.

23. The system of any of clauses 16-22, wherein the computing device comprises one of: a smartphone, a laptop computer, a tablet computer, a smartbook, a satellite telephone, a navigation device, a portable game console, or a personal digital assistant.

24. A computer-readable medium for controlling powering-down of a subsystem of a computing device, the computer-readable medium comprising a non-transitory computer-readable medium having instructions stored thereon in computer-executable form, the instructions when executed by a processing system of a computing device configuring the processing system to:
determine a subsystem current consumption measurement, a subsystem bandwidth usage measurement, and a subsystem efficiency measurement;
determine an idle power-down count value in response to the subsystem current consumption measurement, the subsystem bandwidth usage measurement, and the subsystem efficiency measurement using a plurality of predetermined relations among subsystem current consumption, subsystem bandwidth usage, and subsystem efficiency; and
power down the subsystem in response to a determination of whether the subsystem is idle for an interval not less than a determined idle power-down count value.

25. The computer-readable medium of clause 24, wherein the instructions configuring the processing system to determine the idle power-down count value configure the processing system to determine a most common subsystem current consumption measurement from among a plurality of subsystem current consumption measurements, a most common subsystem bandwidth usage measurement from among a plurality of subsystem bandwidth usage measurements, and a most common subsystem efficiency measurement from among a plurality of subsystem efficiency measurements.

26. The computer-readable medium of clause 24 or 25, wherein the subsystem comprises a dynamic random access memory subsystem.

27. The computer-readable medium of any of clauses 24-26, wherein the plurality of predetermined relations include a first relation between idle power-down count and subsystem current consumption, a second relation between subsystem current consumption measurement and subsystem bandwidth usage, and a third relation between subsystem bandwidth usage and subsystem efficiency.

28. The computer-readable medium of any of clauses 24-27, wherein the first relation is a fifth-order polynomial equation, the second relation is a fourth-order polynomial equation, and the third relation is a third-order polynomial equation, and determining the idle power-down count value comprises solving a system of polynomial equations.

29. The computer-readable medium of any of clauses 24-28, wherein the instructions configuring the processing system to power down the subsystem comprise instructions configuring the processing system to:
determine whether a difference between the determined idle power-down count value and a previous idle power-down count value exceeds a threshold;
power down the subsystem when the subsystem is idle for an interval not less than the determined idle power-down count value and when the difference between the determined idle power-down count value and the previous idle power-down count value exceeds the threshold; and
power down the subsystem when the subsystem is idle for an interval not less than the previous idle power-down count value and when the difference between the determined idle power-down count value and the previous idle power-down count value does not exceed the threshold.

30. The computer-readable medium of clause 29, wherein the instructions configuring the processing system to power down the subsystem further comprise instructions configuring the processing system to:
provide counting logic with the determined idle power-down count value when the subsystem difference between the determined idle power-down count value and the previous idle power-down count value exceeds the threshold;
provide the counting logic with the previous idle power-down count value when the difference between the determined idle power-down count value and the previous idle power-down count value does not exceed the threshold;
reset the counting logic when the subsystem is active; and
power down the subsystem when the counting logic counts a provided number of clock cycles while the subsystem is inactive.

Alternative embodiments will become apparent to one of ordinary skill in the art to which the invention pertains. Therefore, although selected aspects have been illustrated and described in detail, it will be understood that various substitutions and alterations may be made therein.

What is claimed is:

1. A method for controlling powering-down of a subsystem of a computing device, comprising:
    determining, by a processing system, a subsystem current consumption measurement, a subsystem bandwidth usage measurement, and a subsystem efficiency measurement;
    determining, by the processing system, an idle power-down count value in response to the subsystem current consumption measurement, the subsystem bandwidth usage measurement, and the subsystem efficiency measurement using a plurality of predetermined relations among subsystem current consumption, subsystem bandwidth usage, and subsystem efficiency; and
    powering down the subsystem in response to a determination of whether the subsystem is idle for an interval not less than the determined idle power-down count value.

2. The method of claim 1, wherein determining the idle power-down count value comprises determining a most common subsystem current consumption measurement from among a plurality of subsystem current consumption measurements, a most common subsystem bandwidth usage measurement from among a plurality of subsystem bandwidth usage measurements, and a most common subsystem efficiency measurement from among a plurality of subsystem efficiency measurements.

3. The method of claim 1, wherein the subsystem comprises a dynamic random access memory subsystem.

4. The method of claim 3, wherein the plurality of predetermined relations include a first relation between idle power-down count and subsystem current consumption, a second relation between subsystem current consumption measurement and subsystem bandwidth usage, and a third relation between subsystem bandwidth usage and subsystem efficiency.

5. The method of claim 4, wherein the first relation is a fifth-order polynomial equation, the second relation is a fourth-order polynomial equation, and the third relation is a third-order polynomial equation, and determining the idle power-down count value comprises solving a system of polynomial equations.

6. The method of claim 3, wherein powering down the subsystem comprises:
    determining whether a difference between the determined idle power-down count value and a previous idle power-down count value exceeds a threshold;
    powering down the subsystem when the subsystem is idle for an interval not less than the determined idle power-down count value and when the difference between the determined idle power-down count value and the previous idle power-down count value exceeds the threshold; and
    powering down the subsystem when the subsystem is idle for an interval not less than the previous idle power-down count value and when the difference between the determined idle power-down count value and the previous idle power-down count value does not exceed the threshold.

7. The method of claim 6, wherein powering down the subsystem further comprises:
    providing counting logic with the determined idle power-down count value when the difference between the determined idle power-down count value and the previous idle power-down count value exceeds the threshold;
    providing the counting logic with the previous idle power-down count value when the difference between the determined idle power-down count value and the previous idle power-down count value does not exceed the threshold;
    resetting the counting logic when the subsystem is active; and
    powering down the subsystem when the counting logic counts a provided number of clock cycles while the subsystem is inactive.

8. A system for controlling powering-down of a subsystem of a computing device, comprising:
    a processing system configured to:
        determine a subsystem current consumption measurement, a subsystem bandwidth usage measurement, and a subsystem efficiency measurement;
        determine an idle power-down count value in response to the subsystem current consumption measurement, the subsystem bandwidth usage measurement, and the subsystem efficiency measurement using a plurality of predetermined relations among subsystem current consumption, subsystem bandwidth usage, and subsystem efficiency; and
    a power controller configured to power down the subsystem in response to a determination of whether the subsystem is idle for an interval not less than the determined idle power-down count value.

9. The system of claim 8, wherein the processing system is configured to determine the determined idle power-down count value by being configured to determine a most common subsystem current consumption measurement from among a plurality of subsystem current consumption measurements, a most common subsystem bandwidth usage measurement from among a plurality of subsystem bandwidth usage measurements, and a most common subsystem efficiency measurement from among a plurality of subsystem efficiency measurements.

10. The system of claim 8, wherein the subsystem comprises a dynamic random access memory subsystem.

11. The system of claim 10, wherein the plurality of predetermined relations include a first relation between idle power-down count and subsystem current consumption, a second relation between subsystem current consumption measurement and subsystem bandwidth usage, and a third relation between subsystem bandwidth usage and subsystem efficiency.

12. The system of claim 11, wherein the first relation is a fifth-order polynomial equation, the second relation is a fourth-order polynomial equation, and the third relation is a third-order polynomial equation, and determining the determined idle power-down count value comprises solving a system of polynomial equations.

13. The system of claim 10, wherein the processing system and the power controller are configured to power down the subsystem by being configured to:
    determine whether a difference between the determined idle power-down count value and a previous idle power-down count value exceeds a threshold;
    power down the subsystem when the subsystem is idle for an interval not less than the determined idle power-down count value and when the difference between the determined idle power-down count value and the previous idle power-down count value exceeds the threshold; and
    power down the subsystem when the subsystem is idle for an interval not less than the previous idle power-down count value and when the difference between the determined idle power-down count value and the previous idle power-down count value does not exceed the threshold.

14. The system of claim 13, wherein the processing system and the power controller are configured to power down the subsystem by being further configured to:
provide counting logic with the determined idle power-down count value when the difference between the determined idle power-down count value and the previous idle power-down count value exceeds the threshold;
provide the counting logic with the previous idle power-down count value when the difference between the determined idle power-down count value and the previous idle power-down count value does not exceed the threshold;
reset the counting logic when the subsystem is active; and
power down the subsystem when the counting logic counts a provided number of clock cycles while the subsystem is inactive.

15. The system of claim 8, wherein the computing device comprises one of: a smartphone, a laptop computer, a tablet computer, a smartbook, a satellite telephone, a navigation device, a portable game console, or a personal digital assistant.

16. A system for controlling powering-down of a subsystem of a computing device, comprising:
means for determining a subsystem current consumption measurement, a subsystem bandwidth usage measurement, and a subsystem efficiency measurement;
means for determining an idle power-down count value in response to the subsystem current consumption measurement, the subsystem bandwidth usage measurement, and the subsystem efficiency measurement using a plurality of predetermined relations among subsystem current consumption, subsystem bandwidth usage, and subsystem efficiency; and
means for powering down the subsystem in response to a determination of whether the subsystem is idle for an interval not less than the determined idle power-down count value.

17. The system of claim 16, wherein the means for determining the idle power-down count value comprises means for determining a most common subsystem current consumption measurement from among a plurality of subsystem current consumption measurements, a most common subsystem bandwidth usage measurement from among a plurality of subsystem bandwidth usage measurements, and a most common subsystem efficiency measurement from among a plurality of subsystem efficiency measurements.

18. The system of claim 16, wherein the subsystem comprises a dynamic random access memory subsystem.

19. The system of claim 18, wherein the plurality of predetermined relations include a first relation between idle power-down count and subsystem current consumption, a second relation between subsystem current consumption measurement and subsystem bandwidth usage, and a third relation between subsystem bandwidth usage and subsystem efficiency.

20. The system of claim 19, wherein the first relation is a fifth-order polynomial equation, the second relation is a fourth-order polynomial equation, and the third relation is a third-order polynomial equation, and determining the idle power-down count value comprises solving a system of polynomial equations.

21. The system of claim 18, wherein the means for powering down the subsystem comprises:
means for determining whether a difference between the determined idle power-down count value and a previous idle power-down count value exceeds a threshold;
means for powering down the subsystem when the subsystem is idle for an interval not less than the determined idle power-down count value and when the difference between the determined idle power-down count value and the previous idle power-down count value exceeds the threshold, and for powering down the subsystem when the subsystem is idle for an interval not less than the previous idle power-down count value and when the difference between the determined idle power-down count value and the previous idle power-down count value does not exceed the threshold.

22. The system of claim 21, wherein the means for powering down the subsystem further comprises:
means for providing counting logic with the determined idle power-down count value when the difference between the determined idle power-down count value and the previous idle power-down count value exceeds the threshold;
means for providing the counting logic with the previous idle power-down count value when the difference between the determined idle power-down count value and the previous idle power-down count value does not exceed the threshold;
means for resetting the counting logic when the subsystem is active; and
means for powering down the subsystem when the counting logic counts a provided number of clock cycles while the subsystem is inactive.

23. The system of claim 16, wherein the computing device comprises one of: a smartphone, a laptop computer, a tablet computer, a smartbook, a satellite telephone, a navigation device, a portable game console, or a personal digital assistant.

24. A non-transitory computer-readable medium for controlling powering-down of a subsystem of a computing device having instructions stored thereon in computer-executable form, the instructions when executed by a processing system of a computing device configuring the processing system to:
determine a subsystem current consumption measurement, a subsystem bandwidth usage measurement, and a subsystem efficiency measurement;
determine an idle power-down count value in response to the subsystem current consumption measurement, the subsystem bandwidth usage measurement, and the subsystem efficiency measurement using a plurality of predetermined relations among subsystem current consumption, subsystem bandwidth usage, and subsystem efficiency; and
power down the subsystem in response to a determination of whether the subsystem is idle for an interval not less than the determined idle power-down count value.

25. The non-transitory computer-readable medium of claim 24, wherein the instructions configuring the processing system to determine the idle power-down count value configure the processing system to determine a most common subsystem current consumption measurement from among a plurality of subsystem current consumption measurements, a most common subsystem bandwidth usage measurement from among a plurality of subsystem bandwidth usage measurements, and a most common subsystem efficiency measurement from among a plurality of subsystem efficiency measurements.

26. The non-transitory computer-readable medium of claim 24, wherein the subsystem comprises a dynamic random access memory subsystem.

27. The non-transitory computer-readable medium of claim 26, wherein the plurality of predetermined relations include a first relation between idle power-down count and subsystem current consumption, a second relation between subsystem current consumption measurement and subsystem bandwidth usage, and a third relation between subsystem bandwidth usage and subsystem efficiency.

28. The non-transitory computer-readable medium of claim 27, wherein the first relation is a fifth-order polynomial equation, the second relation is a fourth-order polynomial equation, and the third relation is a third-order polynomial equation, and determining the idle power-down count value comprises solving a system of polynomial equations.

29. The non-transitory computer-readable medium of claim 26, wherein the instructions configuring the processing system to power down the subsystem comprise instructions configuring the processing system to:
  determine whether a difference between the determined idle power-down count value and a previous idle power-down count value exceeds a threshold;
  power down the subsystem when the subsystem is idle for an interval not less than the determined idle power-down count value and when the difference between the determined idle power-down count value and the previous idle power-down count value exceeds the threshold; and
  power down the subsystem when the subsystem is idle for an interval not less than the previous idle power-down count value and when the difference between the determined idle power-down count value and the previous idle power-down count value does not exceed the threshold.

30. The non-transitory computer-readable medium of claim 29, wherein the instructions configuring the processing system to power down the subsystem further comprise instructions configuring the processing system to:
  provide counting logic with the determined idle power-down count value when the difference between the determined idle power-down count value and the previous idle power-down count value exceeds the threshold;
  provide the counting logic with the previous idle power-down count value when the difference between the determined idle power-down count value and the previous idle power-down count value does not exceed the threshold;
  reset the counting logic when the subsystem is active; and
  power down the subsystem when the counting logic counts a provided number of clock cycles while the subsystem is inactive.

* * * * *